(12) United States Patent
Singh et al.

(10) Patent No.: US 10,102,936 B2
(45) Date of Patent: *Oct. 16, 2018

(54) NUCLEAR STREAM SUPPLY SYSTEM

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC

( * ) Notice: Subject to any disclaimer, the term of this patent is extended or adjusted under 35 U.S.C. 154(b) by 940 days.

This patent is subject to a terminal disclaimer.

(21) Appl. No.: 14/620,390

(22) Filed: Feb. 12, 2015

(65) Prior Publication Data
US 2015/0243388 A1 Aug. 27, 2015

Related U.S. Application Data

(63) Continuation-in-part of application No. PCT/US2013/054961, filed on Aug. 14, 2013.
(Continued)

(51) Int. Cl.
*G21D 1/00* (2006.01)
*G21D 1/04* (2006.01)
(Continued)

(52) U.S. Cl.
CPC .............. *G21D 1/006* (2013.01); *F01K 5/02* (2013.01); *F22B 1/023* (2013.01); *G21C 1/32* (2013.01);
(Continued)

(58) Field of Classification Search
CPC .................. G21C 15/18; G21C 15/182; G21C 2015/185; G21D 1/04; G21D 1/006; F22B 1/023; F22B 35/04; F22B 35/004
See application file for complete search history.

(56) References Cited

U.S. PATENT DOCUMENTS 3,244,598 A * 4/1966 Rose ............... F22B 1/1823
376/391
3,575,807 A * 4/1971 Ripley ............... G21D 1/04
261/118
(Continued)

OTHER PUBLICATIONS

Ito, T. et al. Development of an Advanced Startup Procedure for a Pius-type Reactor. <URL: http://www.tandfonline.com/dio/abs/10.1080/18811248.1998.9733909#.UqgCS-IUZ0k>, Journal of Nuclear Science and Technology, vol. 35, No. 8., Mar. 15, 2012, pp. 554-563 [Online]. US.

(Continued)

*Primary Examiner* — Sharon M Davis
(74) *Attorney, Agent, or Firm* — The Belles Group, P.C.

(57) ABSTRACT

A nuclear steam supply system having a start-up sub-system for heating a primary coolant. In one embodiment, the invention can be a nuclear steam supply system comprising: a reactor vessel having an internal cavity, a reactor core comprising nuclear fuel disposed within the internal cavity; a steam generating vessel fluidly coupled to the reactor vessel; a primary coolant loop formed within the reactor vessel and the steam generating vessel, a primary coolant in the primary coolant loop; and a start-up sub-system fluidly coupled to the primary coolant loop, the start-up sub-system configured to: (1) receive a portion of the primary coolant from the primary coolant loop; (2) heat the portion of the primary coolant to form a heated portion of the primary coolant; and (3) inject the heated portion of the primary coolant into the primary coolant loop.

26 Claims, 10 Drawing Sheets

Related U.S. Application Data

(60) Provisional application No. 61/683,021, filed on Aug. 14, 2012.

(51) Int. Cl.
  *G21C 15/24* (2006.01)
  *G21C 15/00* (2006.01)
  *G21C 1/32* (2006.01)
  *F22B 1/02* (2006.01)
  *F01K 5/02* (2006.01)

(52) U.S. Cl.
  CPC ............ *G21C 15/00* (2013.01); *G21C 15/24* (2013.01); *G21D 1/04* (2013.01); *Y02E 30/40* (2013.01)

(56) References Cited

U.S. PATENT DOCUMENTS

| | | | | |
|---|---|---|---|---|
| 3,920,513 | A | * 11/1975 | Loose | G21C 9/033 376/219 |
| 4,236,970 | A | * 12/1980 | Harand | F22B 1/023 165/158 |
| 4,656,335 | A | 4/1987 | Durrant et al. | |
| 5,491,731 | A | 2/1996 | Corpora | |
| 2009/0129532 | A1 | 5/2009 | Reyes, Jr. et al. | |

OTHER PUBLICATIONS

Corresponding PCT/US13/54961 Search Report and Written Opinion dated Jan. 13, 2014.

\* cited by examiner

NUCLEAR STREAM SUPPLY SYSTEM

CROSS-REFERENCE TO RELATED PATENT APPLICATIONS

The present application is a continuation-in-part of PCT/US2013/054961 filed Aug. 14, 2013, which claims the benefit of U.S. Provisional Patent Application Ser. No. 61/683,021, filed Aug. 14, 2012, the entirety of which is incorporated herein by reference.

FIELD OF THE INVENTION

The present invention relates to a nuclear steam supply system, and more particularly to a start-up sub-system for heating a primary coolant in a nuclear steam supply system.

BACKGROUND OF THE INVENTION

For starting up a nuclear steam supply system in a typical pressurized water reactor, it is necessary to heat the reactor coolant water to an operating temperature, which is known in the art as the no-load operating temperature of the reactor coolant water. Furthermore, in conventional nuclear steam supply systems it is necessary to ensure full flow through the coolant loop and the core. This is necessary to ensure that a completely turbulated flow across the fuel core exists as the control rods are being withdrawn in order to avoid localized heating and boiling, and to ensure that the reactivity of water is in the optimal range during start-up and during normal operation.

In the present state of the art, the desired start-up condition is achieved by the use of the reactor coolant pump whose primary function is to circulate coolant through the reactor core during normal operating conditions. In normal operation, the substantial frictional heat produced by the reactor coolant pumps is removed by external cooling equipment (heat exchangers) to maintain safe operating temperature. However, during start-up external cooling is disabled so that the frictional heat can be directly transferred to the reactor coolant water, enabling it to reach no-load operating temperature. As the reactor coolant water is being heated, the pressure in the reactor coolant loop is increased using a bank of internal heaters which evaporates some reactor coolant water and increases the pressure in the reactor coolant system by maintaining a two-phase equilibrium.

The above process for heating the reactor water inventory during start-up is not available in a passively safe nuclear steam supply system. This is because such a passively safe nuclear steam supply system does not include or require any pumps, and thus the use of the frictional heat is unavailable for heating the reactor water inventory. Thus, a need exists for a start-up system for heating the reactor water inventory in a passively safe nuclear steam supply system.

SUMMARY OF THE INVENTION

The present invention provides an improved nuclear steam supply system and start-up sub-system therefor that overcomes the deficiencies of the foregoing existing arrangements. The present invention also provides an improved method of heating a primary coolant in a nuclear steam supply system to a no load operating temperature.

In one aspect, the invention can be a nuclear steam supply system comprising: a reactor vessel having an internal cavity, a reactor core comprising nuclear fuel disposed within the internal cavity; a steam generating vessel fluidly coupled to the reactor vessel; a riser pipe positioned within the steam generating vessel and fluidly coupled to the reactor vessel; a primary coolant at least partially filling a primary coolant loop formed within the reactor vessel and the steam generating vessel; and a start-up sub-system comprising: an intake conduit having an inlet located in the primary coolant loop; a pump fluidly coupled to the intake conduit for pumping a portion of the primary coolant from the primary coolant loop through the intake conduit and into an injection conduit; at least one heating element for heating the portion of the primary coolant to form a heated portion of the primary coolant; and an injection nozzle fluidly coupled to the injection conduit and positioned within the riser pipe for injecting the heated portion of the primary coolant into the riser pipe.

In another aspect, the invention can be a nuclear steam supply system comprising: a reactor vessel having an internal cavity, a reactor core comprising nuclear fuel disposed within the internal cavity; a steam generating vessel fluidly coupled to the reactor vessel; a primary coolant loop formed within the reactor vessel and the steam generating vessel, a primary coolant in the primary coolant loop; and a start-up sub-system fluidly coupled to the primary coolant loop, the start-up sub-system configured to: (1) receive a portion of the primary coolant from the primary coolant loop; (2) heat the portion of the primary coolant to form a heated portion of the primary coolant; and (3) inject the heated portion of the primary coolant into the primary coolant loop.

In yet another aspect, the invention can be a method of heating a primary coolant to a no-load operating temperature in a nuclear steam supply system, the method comprising: a) filling a primary coolant loop within a reactor vessel and a steam generating vessel that are fluidly coupled together with a primary coolant; b) drawing a portion of the primary coolant from the primary coolant loop and into a start-up sub-system; c) heating the portion of the primary coolant within the start-up sub-system to form a heated portion of the primary coolant; and d) injecting the heated portion of the primary coolant into the primary coolant loop.

In a further aspect, the invention can be a method of starting up a nuclear steam supply system, the method comprising: a) at least partially filling a primary coolant loop within a reactor vessel and a steam generating vessel that are fluidly coupled together with a primary coolant, wherein the primary coolant loop comprises a riser pipe in the steam generating vessel; b) drawing a portion of the primary coolant from the primary coolant loop and into a start-up sub-system; c) heating the portion of the primary coolant within the start-up sub-system to form a heated portion of the primary coolant; and d) introducing the heated portion of the primary coolant into the riser pipe of the steam generating vessel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which.

Figure 1:
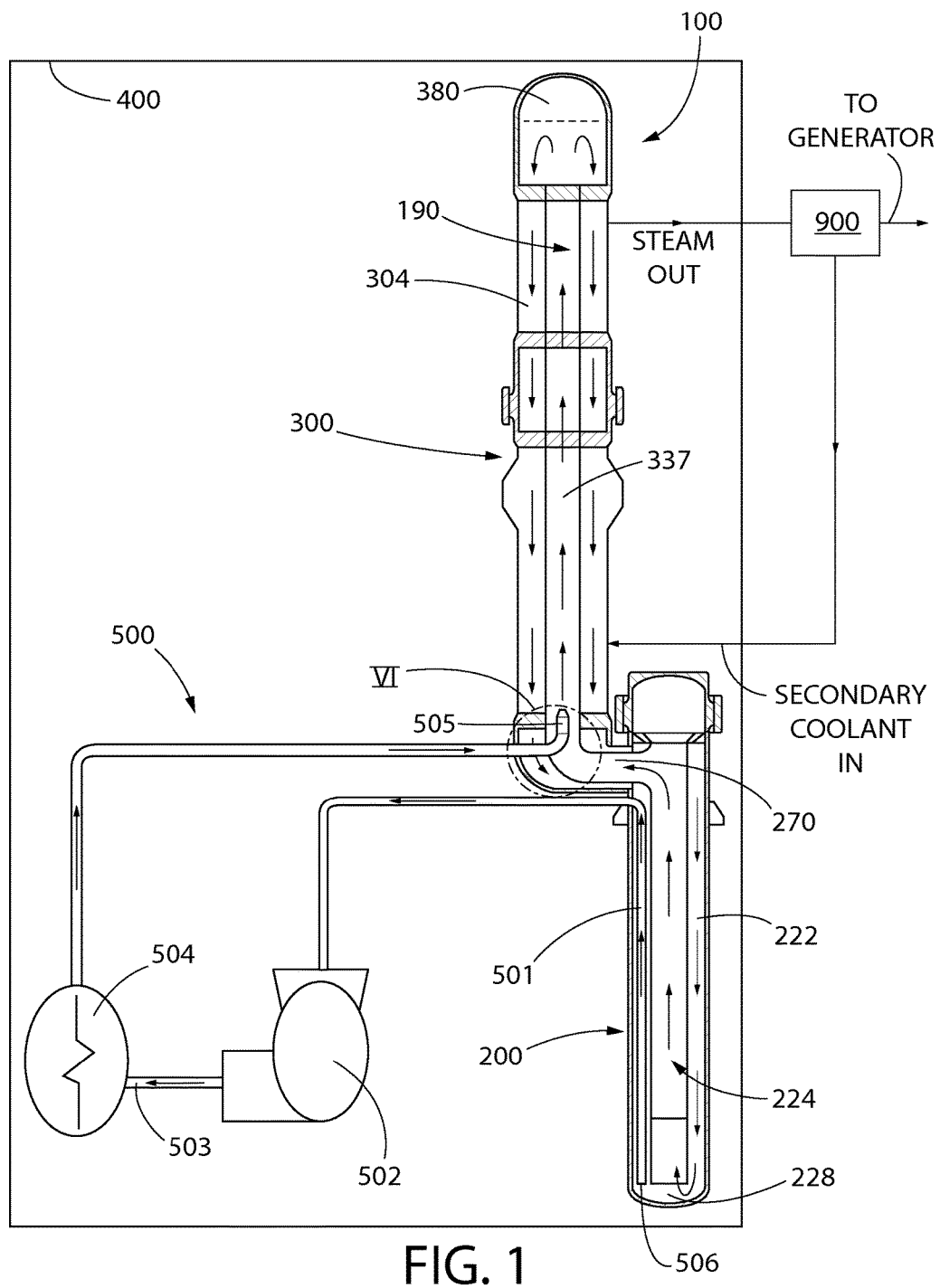
FIG. 1 is front view of a nuclear steam supply system including a reactor vessel, a steam generating vessel and a start-up sub-system in accordance with an embodiment of the present invention.

All drawings are schematic and not necessarily to scale.

DETAILED DESCRIPTION OF THE INVENTION

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal,", "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Referring first to FIG. 1, a nuclear steam supply system 100 is illustrated in accordance with an embodiment of the present invention. Although described herein as being a nuclear steam supply system, in certain embodiments the system may be generally referred to herein as a steam supply system. The inventive nuclear steam supply system 100 is typically used in a nuclear pressurized water reactor and generally comprises a reactor vessel 200, a steam generating vessel 300 and a start-up sub-system 500. Of course, the nuclear steam supply system 100 can have uses other than for nuclear pressurized water reactors as can be appreciated.

During normal operation of the nuclear steam supply system 100, a primary coolant flows through a primary coolant loop 190 within the reactor vessel 200 and the steam generating vessel 300. This primary coolant loop 190 is depicted with arrows in FIG. 1. Specifically, the primary coolant flows upwardly through a riser column 224 in the reactor vessel 200, from the reactor vessel 200 to the steam generating vessel 300 through a fluid coupling 270, upwardly through a riser pipe 337 in the steam generating vessel 300 to a top of the steam generating vessel 300 (i.e., to a pressurizer 380), and then downwardly through tubes 332 (see FIGS. 3 and 4) in a tube side 304 of the steam generating vessel 300, from the steam generating vessel 300 to the reactor vessel 200 through the fluid coupling 270, downwardly through a downcomer 222 of the reactor vessel 200, and then back from the downcomer 222 of the reactor vessel 200 to the riser column 224 of the reactor vessel 200. The primary coolant continues to flow along this primary coolant loop 190 as desired without the use of any pumps during normal operation of the nuclear steam supply system 100.

It should be appreciated that in certain embodiments the primary coolant loop 190 is filled or partially filled with the primary coolant when the nuclear steam supply system 100 is shut down and not operating. By filled it may mean that the entire primary coolant loop 190 is completely filled with the primary coolant, or that the primary coolant loop 190 is almost entirely filled with the primary coolant with some room for air which leaves space for the addition of more primary coolant if desired or the expansion of the primary coolant as it heats up during the start-up procedures discussed below. In certain embodiments, before start-up the primary coolant is static in the primary coolant loop 190 in that there is no flow of the primary coolant along the primary coolant loop. However, during a start-up procedure utilizing the start-up sub-system 500 discussed in detail below, the primary coolant is heated and caused to flow through the primary coolant loop 190 and eventually is able to flow through the primary coolant loop 190 passively and unaided by any pumps due to the physics concept of thermosiphon flow.

Before nuclear fuel within the reactor core engages in a fission chain reaction to produce heat, a start-up process using the start-up sub-system 500 takes place to heat the primary coolant to a no-load operating temperature, as discussed in more detail below. During normal operation of the nuclear steam supply system 100, the primary coolant has an extremely high temperature due to its flowing through the reactor core. Specifically, nuclear fuel in the reactor vessel 200 engages in the fission chain reaction, which produces heat and heats the primary coolant as the primary coolant flows through the reactor core of the reactor vessel 200. This heated primary coolant is used to phase-change a secondary coolant from a liquid into steam as discussed below.

While the primary coolant is flowing through the primary coolant loop 190 during normal operation, the secondary coolant is flowing through a second coolant loop. Specifically, the secondary coolant is introduced into the shell side 305 (FIGS. 3 and 4) of the steam generating vessel 300 at the secondary coolant in location indicated in FIG. 1. The secondary coolant then flows through the shell side 305 (FIGS. 3 and 4) of the steam generating vessel 300 where it is heated by heat transfer from the primary coolant. The secondary coolant is converted into steam due to the heat transfer, and the steam flows from the steam generating vessel 300 to a turbine 900 as indicated in FIG. 1. The turbine 900 drives an electric generator which is connected to the electrical grid for power distribution. The steam then travels from the turbine 900 to a condenser (not illustrated) whereby the steam is cooled down and condensed. Thus, the condenser converts the steam back to a liquid (i.e., the secondary coolant) so that it can be pumped back into the steam generator 300 at the secondary coolant in location and repeat its flow through the flow path discussed above.

In certain embodiments both the primary coolant and the secondary coolant may be water, such as demineralized water. However, the invention is not to be so limited and other liquids or fluids can be used in certain other embodiments, the invention not being limited to the material of the primary and secondary coolants unless so claimed.

The primary coolant continues to flow through the primary coolant loop and the secondary coolant continues to flow in the second coolant loop during normal operation of the nuclear steam supply system 100. The general operation of the nuclear steam supply system 100 and details of the components is described in detail in International Application No. PCT/US13/38289, filed on Apr. 25, 2013, the entirety of which is incorporated herein by reference.

Referring to FIGS. 1-4, the general details of the components and the operation of the nuclear steam supply system 100, and specifically of the reactor vessel 200 and the steam generating vessel 300, will be described. In the exemplified embodiment, the reactor vessel 200 and the steam generating vessel 300 are vertically elongated and separate components which hydraulically are closely coupled, but are discrete vessels in themselves that are thermally isolated except for the exchange of primary coolant (i.e. reactor coolant) flowing between the vessels in the fluid coupling 270 of the primary coolant loop 190 as discussed above. In one non-limiting embodiment, each of the reactor vessel 200 and the steam generating vessel 300 may be made of a corrosion resistant metal such as stainless steel, although other materials of construction are possible.

Figure 2:
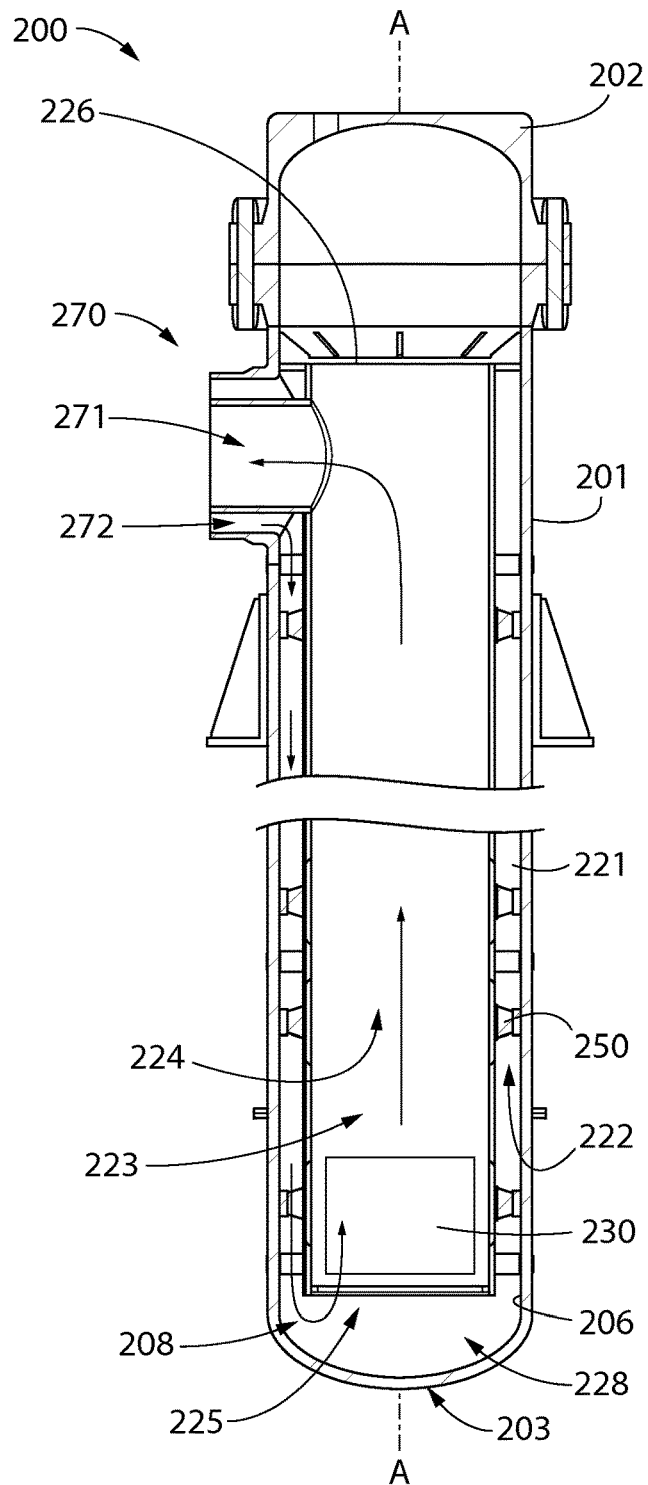
FIG. 2 is an elevation cross-sectional view of the reactor vessel of FIG. 1.

Referring to FIGS. 1 and 2 concurrently, the reactor vessel 200 will be further described. The reactor vessel 200 in one non-limiting embodiment is an ASME code Section III, Class 1 thick-walled cylindrical pressure vessel comprised of a cylindrical sidewall shell 201 with an integrally welded hemispherical bottom head 203 and a removable hemispherical top head 202. The shell 201 defines an internal cavity 208 configured for holding the reactor core which comprises the nuclear fuel. Specifically, the reactor vessel 200 includes a cylindrical reactor shroud 220 which contains the reactor core defined by a fuel cartridge 230 (i.e., nuclear fuel). The reactor shroud 220 transversely divides the shell portion of the reactor vessel into two concentrically arranged spaces: (1) an outer annulus 221 defining the annular downcomer 222 for primary coolant entering the reactor vessel which is formed between the outer surface of the reactor shroud 220 and an inner surface 206 of the shell 201; and (2) a passageway 223 defining the riser column 224 for the primary coolant leaving the reactor vessel 200 heated by fission in the reactor core.

The reactor shroud 220 is elongated and extends in an axial direction along a vertical axis A-A of the reactor vessel 200. The reactor shroud 220 includes an open bottom end 225 and a closed top end 226. In one embodiment, the open bottom end 225 of the reactor shroud 220 is vertically spaced apart by a distance from the bottom head 203 of the reactor vessel 200 thereby forming a bottom flow plenum 228 between the bottom end 225 of the reactor shroud 220 and the bottom head 203 of the reactor vessel 200. As will be discussed in more detail below, during flow of the primary coolant through the primary coolant loop 190, the bottom flow plenum 228 collects the primary coolant from the annular downcomer 222 and directs the primary coolant flow into the inlet of the riser column 224 formed by the open bottom end 225 of the reactor shroud 220.

In certain embodiments, the reactor shroud 220 is a double-walled cylinder which may be made of a corrosion resistant material, such as without limitation stainless steel. This double-wall construction of the reactor shroud 220 forms an insulated structure designed to retard the flow of heat across it and forms a smooth vertical riser column 224 for upward flow of the primary coolant heated by the fission in the fuel cartridge 230 ("core"), which is preferably located at the bottom extremity of the shroud 220 in one embodiment as shown in FIG. 2. In certain embodiments, shroud 220 may be a multi-walled cylinder having more than two walls to further decrease the heat transfer across the shroud from the hot riser to the cold downcomer. The vertical space above the fuel cartridge 230 in the reactor shroud 220 may also contain interconnected control rod segments along with a set of "non-segmental baffles" that serve to protect them from flow induced vibration during reactor operations. The reactor shroud 220 is laterally supported by the reactor vessel by support members 250 to prevent damage from mechanical vibrations that may induce failure from metal fatigue.

In certain embodiments, the fuel cartridge 230 is a unitary autonomous structure containing upright fuel assemblies, and is situated in a region of the reactor vessel 200 that is spaced above the bottom head 203 so that a relatively deep plenum of water lies underneath the fuel cartridge 230. The fuel cartridge 230 is insulated by the reactor shroud 220 so that a majority of the heat generated by the fission reaction in the nuclear fuel core is used in heating the primary coolant flowing through the fuel cartridge 230 and adjoining upper portions of the riser column 224. In certain embodiments, the fuel cartridge 230 is an open cylindrical structure including cylindrically shaped sidewalls, an open top, and an open bottom to allow the primary coolant to flow upward completely through the cartridge (see directional flow arrows, described in detail above with specific reference to FIG. 1). In one embodiment, the sidewalls of the fuel cartridge 230 may be formed by multiple arcuate segments of reflectors which are joined together by suitable means. The open interior of the fuel cartridge 230 may be filled with a support grid for holding the nuclear fuel rods and for insertion of control rods into the core to control the fission reaction as needed.

In the interconnecting space between the reactor vessel 200 and the steam generating vessel 300 there is a fluid coupling 270 that comprises an inner flow path 271 and an outer flow path 272 that concentrically surrounds the inner flow path 271. As will be discussed in more detail below, during flow of the primary coolant the primary coolant flows upwardly within the riser column 224 and through the inner flow path 271 of the fluid coupling 270 to flow from the reactor vessel 200 to the steam generating vessel 300. After the primary coolant gets to the top of the steam generating vessel 300, the primary coolant begins a downward flow through the steam generating vessel 300 and then flows through the outer flow path 272 from the steam generating vessel 300 and into the downcomer 222 of the reactor vessel 200. Again, this flow path will be described in more detail below.

Figure 3:
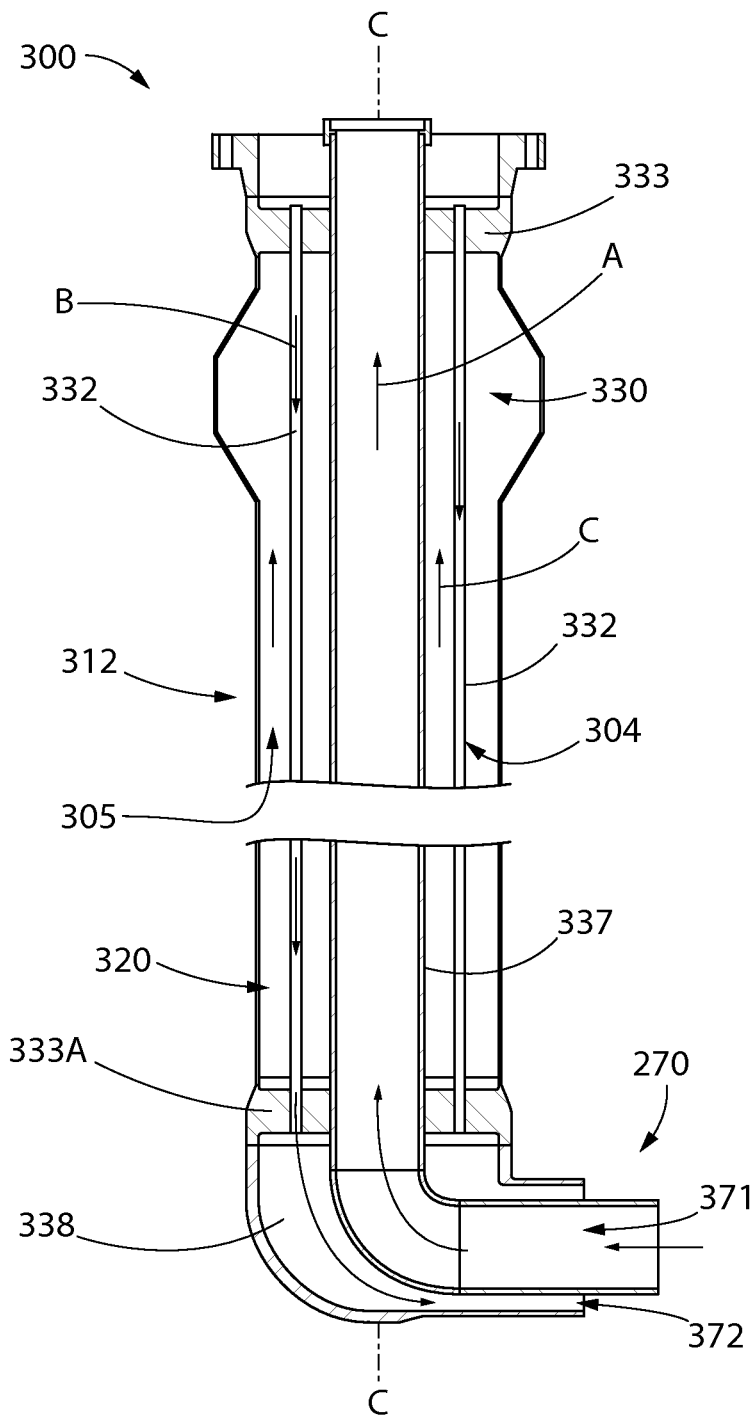
FIG. 3 is an elevation cross-sectional view of the bottom portion of the steam generating vessel of FIG. 1.
Figure 4:
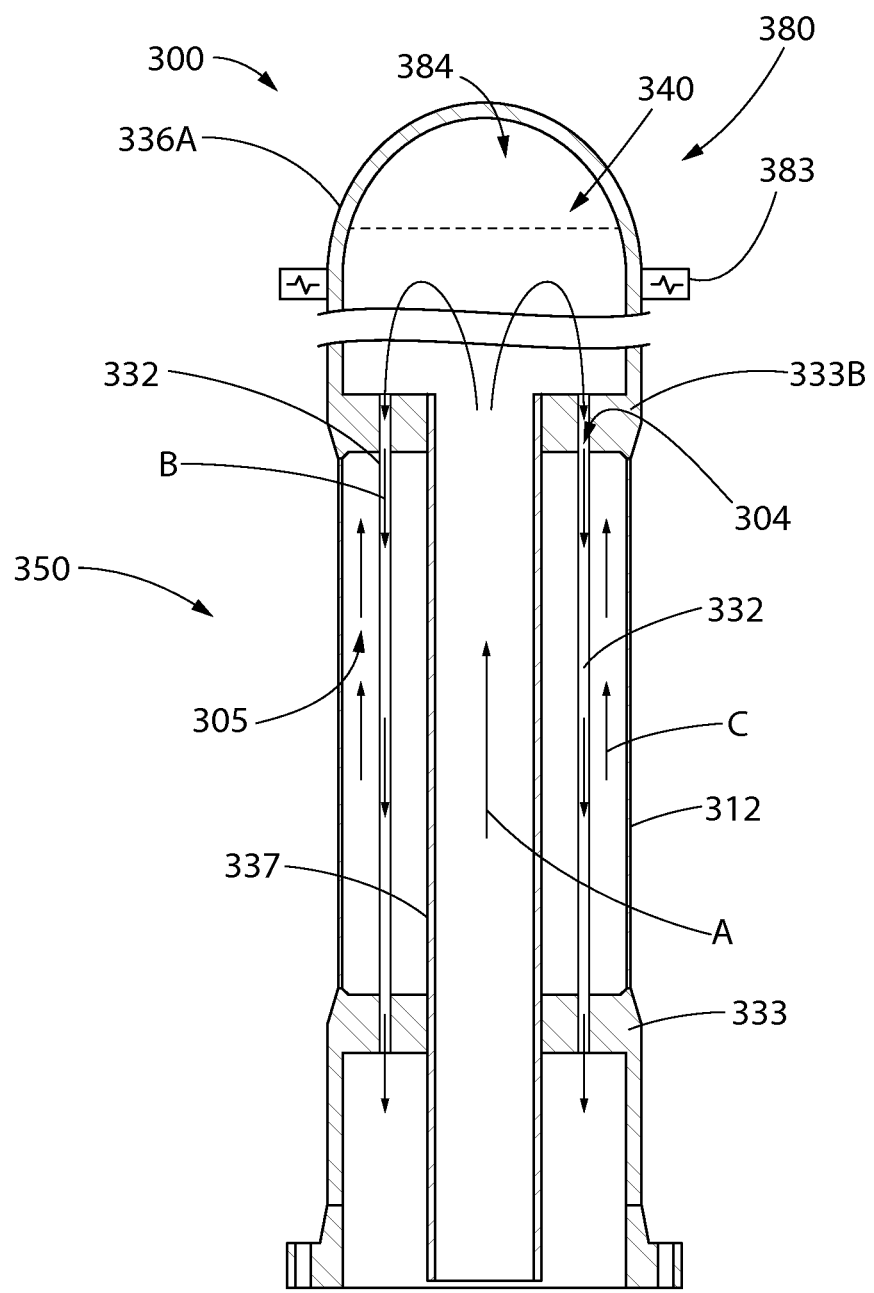
FIG. 4 is an elevation cross-sectional view of the top portion of the steam generating vessel of FIG. 1.

Turning now to FIGS. 1, 3 and 4 concurrently, the details of the steam generating vessel 300 will be described in more detail. In certain embodiments, the steam generating vessel 300 includes a preheater section 320, a steam generator section 330, a superheater section 340 and a pressurizer 380. However, the invention is not to be so limited and one or more of the sections of the steam generating vessel 300 may be omitted in certain other embodiments. Specifically, in certain embodiments the preheater section 320 may be omitted, or may itself be considered a part of the steam generator section 330. As discussed above, it is within the steam generator vessel 300 that the secondary coolant that is flowing through the shell side 305 of the steam generator vessel 300 is converted from a liquid (i.e., secondary coolant inlet illustrated in FIG. 1) to a superheated steam that is sent to the turbine 900 (FIG. 1) for electricity generation. The secondary coolant flows in the second coolant loop through the shell side of the steam generating vessel 300, out to the turbine 900, from the turbine 900 to a condenser, and then back into the shell side of the steam generating vessel 300.

In the exemplified embodiment, each of the preheater 320, the steam generator 330, and the superheater 350 are tubular heat exchangers having a tube side 304 and a shell side 305. The tube side 304 of the tubular heat exchangers include a tube bundle comprising a plurality of parallel straight tubes 332 and tubesheets 333 disposed at the extremities or ends of each tube bundle that support the tubes. In the exemplified embodiment, only two tubes 332 are illustrated to avoid clutter. However, in actual use tens, hundreds or thousands of tubes 332 can be positioned within each of the sections of the steam generating vessel 300. In certain embodiments, a bottom-most one of the tubesheets 333A is located in the preheater section 320 or in the steam generator section 330. This bottom-most tubesheet 333A will be discussed in more detail below with regard to a location of injection from the start-up sub-system 500 in one exemplified embodiment.

As noted above, in one embodiment the preheater section 320 can be considered as a part of the steam generator section 330. In such embodiments the steam generator section 330 and the superheater section 350 can be considered as stacked heat exchangers such that the superheater section 350 is disposed above the steam generator section 330. In certain embodiments, the preheater section 320, steam generator section 330, and superheater section 350 are positioned to form a parallel counter-flow type heat exchanger arrangement in which the secondary coolant (Rankine cycle) flows in an opposite, but parallel direction to the primary coolant (see FIGS. 3 and 4). Specifically, the arrows labeled A indicate the flow direction of the primary coolant through the riser pipe 337 that is positioned within the steam generating vessel 300, the arrows labeled B indicate the flow direction of the primary coolant through the tubes 332 of the steam generating vessel 300, and the arrows labeled C indicate the flow direction of the secondary coolant through the shell side 305 of the steam generating vessel 300. The trio of the foregoing tubular heat exchangers (i.e. preheater, steam generator, and superheater) are hydraulically connected in series on both the tube side 304 (primary coolant) and the shell side 305 (the secondary coolant forming the working fluid of the Rankine Cycle which changes phase from liquid to superheated gas).

In the exemplified embodiment, the steam generating vessel 300 includes a top 310, a bottom 311, an axially extending cylindrical shell 312, and the internal riser pipe 337 which is concentrically aligned with the shell 312 and in the exemplified embodiment lies on a centerline C-C of the steam generating vessel 300. The tubes 332 are circumferentially arranged around the outside of the riser pipe 337 between the riser pipe 337 and the shell 312 in sections of the steam generating vessel 300 which include the preheater 320, the steam generator 330, and the superheater 350. In one embodiment, the riser pipe 337 extends completely through all of the tubesheets 333 associated with the preheater 320, the steam generator 330, and the superheater 350 from the top of the steam generating vessel 300 to the bottom to form a part of the continuous primary coolant loop 190 between the reactor vessel 200 and the steam generating vessel 300 all the way to the pressurizer 380.

The fluid coupling 270 includes an inner flowpath 371 and an outer flowpath 372 on the steam generating vessel 300 side of the fluid coupling 270. The inner flowpath 371 is fluidly coupled to the inner flow path 271 and the outer flowpath 372 is fluidly coupled to the outer flowpath 272. Thus, via these operable couplings the steam generating vessel 300 is fluidly coupled to the reactor vessel 200 to complete the primary coolant loop 190 for flow of the primary coolant through both the reactor vessel 200 and the steam generating vessel 300. An annular space is formed between the riser pipe 337 and the shell 312, which forms a bottom plenum 338. The bottom plenum 338 collects and channels the primary coolant from the steam generating vessel 300 back to the reactor vessel 200 via the outer flow paths 272, 372. Thus, in the exemplified embodiment the primary coolant flows from the reactor vessel 200 to the steam generating vessel 300 through the inner flow paths 271, 371 and the primary coolant flows from the steam generating vessel 300 to the reactor vessel 200 through the outer flow paths 272, 372. However, the invention is not to be so limited and in other embodiments the use of the flow paths 271, 272, 371, 372 can be reversed The superheater 350 is topped by a pressurizer 380 as shown in FIGS. 1 and 4, which is in fluid communication with both the top or outlet of the riser pipe 337 and the inlet to the tubes 332 of the superheater 350. In one embodiment, the pressurizer 380 is mounted directly to the shell 312 of the steam generating vessel 300 and forms a top head 336a on the shell. In one embodiment, the pressurizer has a domed or hemispherical head and may be welded to the shell 312, or alternatively bolted in other possible embodiments. The pressurizer 380 forms an upper plenum which collects reactor primary coolant rising through riser pipe 337 and distributes the primary coolant from the riser pipe 337 to the superheater tubes 332. In certain embodiments, the pressurizer 380 includes a heating/quenching element 38. (i.e. water/steam) for pressure control of the reactor primary coolant.

Shown schematically in FIG. 4, the heating/quenching element 383 is comprised of a bank of electric heaters which are installed in the pressurizer section that serve to increase the pressure by boiling some of the primary coolant and creating a steam bubble that resides at the top of the pressurizer near the head (above the liquid/gas interface 340 represented by the dashed line). A water spray column 384 is located near the top head 336a of the pressurizer 380 which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 380 and the heating/quenching element 383 may be without limitation about 2,250 psi. In alternative embodiments, as noted above, the liquid/gas interface 340 is formed between an inert gas, such as nitrogen (N2) supplied by supply tanks (not shown) connected to the pressurizer 380, and the liquid primary coolant.

In one embodiment, the external surfaces of the tubes 332 may include integral fins to compensate for the reduced heat transfer rates in the gaseous superheated steam media. The superheater tube bundle is protected from erosion (i.e. by tiny water droplets that may remain entrained in the upflowing steam) by ensuring that the steam flow is counterflow being parallel along, rather than across, the tubes 332 in the tube bundle.

Figure 5A:
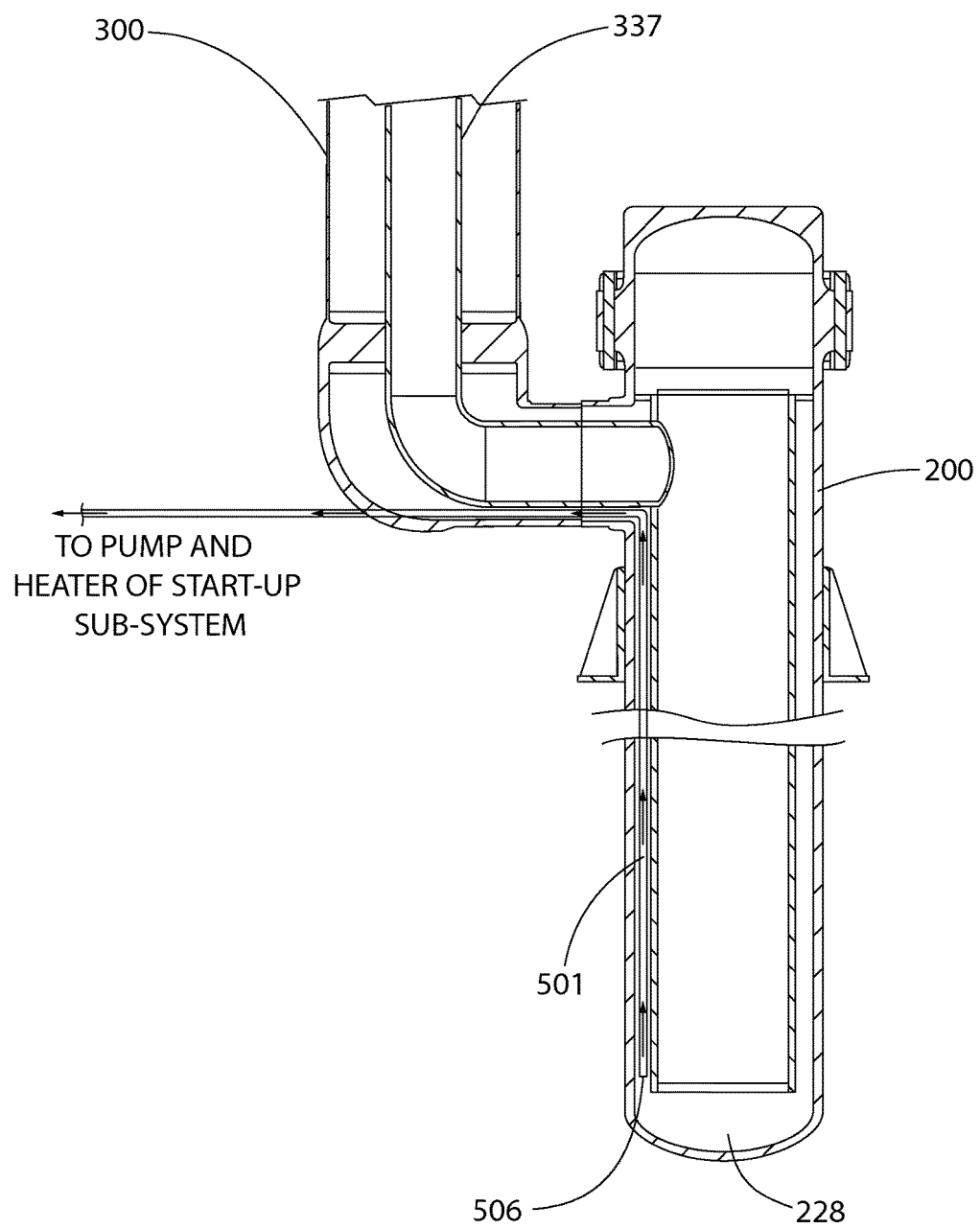
FIG. 5A is a close-up view of the reactor vessel and a portion of the steam generating vessel of FIG. 1 illustrating the location of an intake conduit of the start-up sub-system in accordance with a first embodiment of the present invention.

Referring now to FIGS. 1 and 5A, the start-up sub-system 500 of the nuclear steam supply system 100 will be described in accordance with one embodiment of the present invention. In addition to discussing the components of the start-up sub-system 500 below, the operation of the start-up sub-system 500 in conjunction with the operation of the nuclear steam supply system 100 as a whole will be discussed below. Prior to the start-up processes taking place as will be discussed in more detail below, the primary coolant loop 190 is filled with the primary coolant, but the primary coolant is at ambient temperature and is not flowing through the primary coolant loop 190. Utilizing the start-up subsystem 500 of the present invention, the primary coolant is heated, made to flow through the primary coolant loop 190, and then able to continue passively flowing through the primary coolant loop 190 without the use of any pumps after disconnecting the start-up sub-system 500 from the primary coolant loop 190. It will be appreciated that in certain embodiments, nuclear heat from the reactor may be used to heat the primary coolant and the start-up system to provide circulation up to a certain fraction of full natural circulation flow.

In order to start up the nuclear steam supply system 100 and begin withdrawing the control rods to initiate a fission chain reaction by the nuclear fuel in the reactor vessel 200, the primary coolant should be heated to a no load operating temperature, which in certain embodiments can be between 500° F. and 700° F., more specifically between 550° F. and 650° F., and more specifically approximately 600° F. Ensuring that the primary coolant is at the no load operating temperature before normal operation (i.e., before flowing the steam to the turbine and before withdrawing the control rods) is beneficial for several reasons. First, it ensures that the primary coolant has a completely turbulated flow across the fuel core while the control rods are being withdrawn, which avoids localized heating and boiling. Second, it ensures that the reactivity of the water is in the optimal range during start-up and normal operation. Because the nuclear steam supply system 100 does not utilize any pumps to flow the primary fluid through the primary coolant loop 190 during normal operation but rather relies on thermosiphon flow as discussed above, conventional means of using frictional heat from the pumps to heat up the primary coolant is unavailable. Thus, the inventive nuclear steam supply system 100 uses the start-up sub-system 500 to heat the primary coolant up to the no load operating temperature during start up procedures.

The start-up sub-system 500 is designed to have a high margin of safety. The start-up sub-system 500 also ensures a fully turbulent flow across the fuel core in the reactor vessel 200 and heats the water to no-load operating temperature prior to any withdrawal of the control rods. As discussed in detail above, during start-up of the nuclear steam supply system 100, the primary coolant is located within the primary coolant loop 190 in the reactor vessel 200 and in the steam generating vessel 300, but it does not flow through the primary coolant loop 190 initially. While the primary fluid is positioned in the primary coolant loop 190, the start-up sub-system 500 draws or receives a portion of the primary coolant from the primary coolant loop 190, heats up the portion of the primary coolant to form a heated portion of the primary coolant, and injects the heated portion of the primary coolant back into the primary coolant loop 190. Thus, the start-up sub-system 500 forms a fluid flow circuit that withdraws some of the primary coolant from the primary coolant loop 190 and heats the primary coolant prior to re-injecting that portion of the primary coolant into the primary coolant loop 190.

When the start-up sub-system 500 injects the heated portion of the primary coolant into the primary coolant loop 190, this initiates a venturi effect that creates fluid flow of the entire body of the primary coolant within the primary coolant loop 190. Specifically, the injected heated portion of the primary coolant flows within the primary coolant loop and pulls the initially static primary coolant within the primary coolant loop 190 with it as it flows, thereby creating an entire turbulent flow of the primary coolant (including the original static primary coolant and the heated portion of the primary coolant) through the primary coolant loop 190. Furthermore, because the primary coolant injected from the start-up sub-system is heated relative to the temperature of the primary coolant within the primary coolant loop 190, this injection begins to heat up the primary coolant inventory within the primary coolant loop 190. When the primary coolant within the primary coolant loop 190 reaches the no-load operating temperature, the start-up sub-system 500 can be fluidly disconnected from the reactor vessel 200 and the steam generating vessel 300 and flow of the primary coolant through the primary coolant loop 190 will continue due to thermosiphon properties.

In the exemplified embodiment, the start-up sub-system 500 comprises an intake conduit 501, a pump 502, an injection conduit 503, a heating element 504 and an injection nozzle 505. The intake conduit 501, the pump 502, the injection conduit 503 and the injection nozzle 505 are all fluidly coupled together so that a portion of the primary coolant that is received by the start-up sub-system 500 will flow through each of the intake conduit 501, the pump 502, the injection conduit 503 and the injection nozzle 505.

In the exemplified embodiment, the entire nuclear steam supply system 100 including the reactor vessel 200, the steam generating vessel 300 and the start-up sub-system 500 are housed within a containment vessel 400. This ensures that in the event of a loss-of-coolant accident during start-up, all of the high energy fluids are contained within the containment boundary of the containment vessel 400. The details of the containment vessel 400 can be found in PCT/US13/42070, filed on May 21, 2013, the entirety of which is incorporated herein by reference. Furthermore, the start-up sub-system 500 is at least partially positioned external to the reactor vessel 200 and to the steam generating vessel 300. Specifically, in the exemplified embodiment while the intake conduit 501 is at least partially positioned within one of the reactor vessel 200 or the steam generating vessel 300 to draw a portion of the primary coolant into the start-up sub-system 500 and the injection nozzle 505 is at least partially positioned within one of the reactor vessel 200 or the steam generating vessel 300 to inject the heated portion of the primary coolant back into one of the reactor vessel 200 or the steam generating vessel 300, the pump 502 and the heating element 504 are positioned entirety external to the reactor vessel 200 and to the steam generating vessel 300.

The portion of the primary coolant that is introduced into the start-up sub-system 500 flows in a single direction through the start-up sub-system 500 from the intake conduit 501 to the injection nozzle 505. The intake conduit 501 and the injection conduit 503 can be a single pipe or conduit or can be multiple pipes or conduits that are fluidly coupled together. In some embodiments, the intake conduit 501 and the injection conduit 504 comprise heavy wall pipes that are sized to be between five and seven inches in diameter, and more specifically approximately six inches in diameter. Furthermore, the injection nozzle 505 has a smaller diameter than the diameter of the intake conduit 501 and the injection conduit 504, and can be between two and four inches, or approximately three inches. However, the invention is not to be so limited and the sizing of the intake conduit 501, the injection conduit 504 and the injection nozzle 505 can be greater than or less than the noted ranges in other embodiments.

In the exemplified embodiment, the pump 502 is a centrifugal pump designed to pump a sufficiently large flow of the primary coolant to develop turbulent conditions in the reactor core. Specifically, in certain embodiments the pump 502 can pump approximately 10% of the normal flow through the primary coolant loop 190 and is able to overcome any pressure differential through the riser pipe 337. Of course, the invention is not to be so limited and the pump 502 can be any type of pump and can pump any amount of the primary coolant through the start-up sub-system 500 as desired or needed for start-up procedures to be successful.

The heating element 504 can be any mechanism that is capable of transferring heat into the portion of the primary coolant that is flowing through the start-up sub-system 500. The heating element 504 can be a single heater or a bank of heaters. The heating element can take on any form, including being a resistance wire, molybdenum disilicide, etched foil, a heat lamp, PTC ceramic, a heat exchanger or any other element that can provide heat to a liquid that is flowing through a conduit. In certain embodiments the heating element 504 can be powered by electrically powered resistance rods. In other embodiments, the heating element 504 can be powered by tubular heat exchangers supplied with steam by an auxiliary steam boiler. Any mechanism can be used as the heating element 504 so long as the heating element 504 can transfer heat into the primary coolant in order to heat up the portion of the primary coolant that is flowing through the start-up sub-system 500.

In the exemplified embodiment, the intake conduit 501 comprises an inlet 506 that is located within the primary coolant loop 190. More specifically, in the embodiment of FIG. 1 the inlet 506 of the intake conduit 501 is positioned at a bottom of the reactor vessel 200. This may include positioning the inlet 506 of the intake conduit 501 within the bottom flow plenum 228 of the reactor vessel 200. However, the invention is not to be so limited and the bottom of the reactor vessel 200 may include positioning the inlet 506 of the intake conduit 501 adjacent to the bottom end 225 of the shroud 220. Furthermore, in other embodiments the inlet 506 of the intake conduit 501 can be located in a central vertical region of the reactor vessel 200 or in a top vertical region of the reactor vessel 200 or within the steam generating vessel 300 as discussed in more detail below with reference to FIGS. 5A-5C. Positioning the inlet 506 of the intake conduit 501 at the bottom of the reactor vessel 200 ensures that the portion of the primary coolant that is removed from the primary coolant loop and received by the start-up sub-system 500 is the coolest or coldest primary coolant available in the primary coolant loop. Such positioning of the inlet 506 of the intake conduit 501 can reduce start-up time. However, the invention is not to be limited by positioning the inlet 506 of the intake conduit 501 at the bottom of the reactor vessel 200, and other positions are possible as discussed above and again below with regard to FIGS. 5A-5C.

Figure 5B:
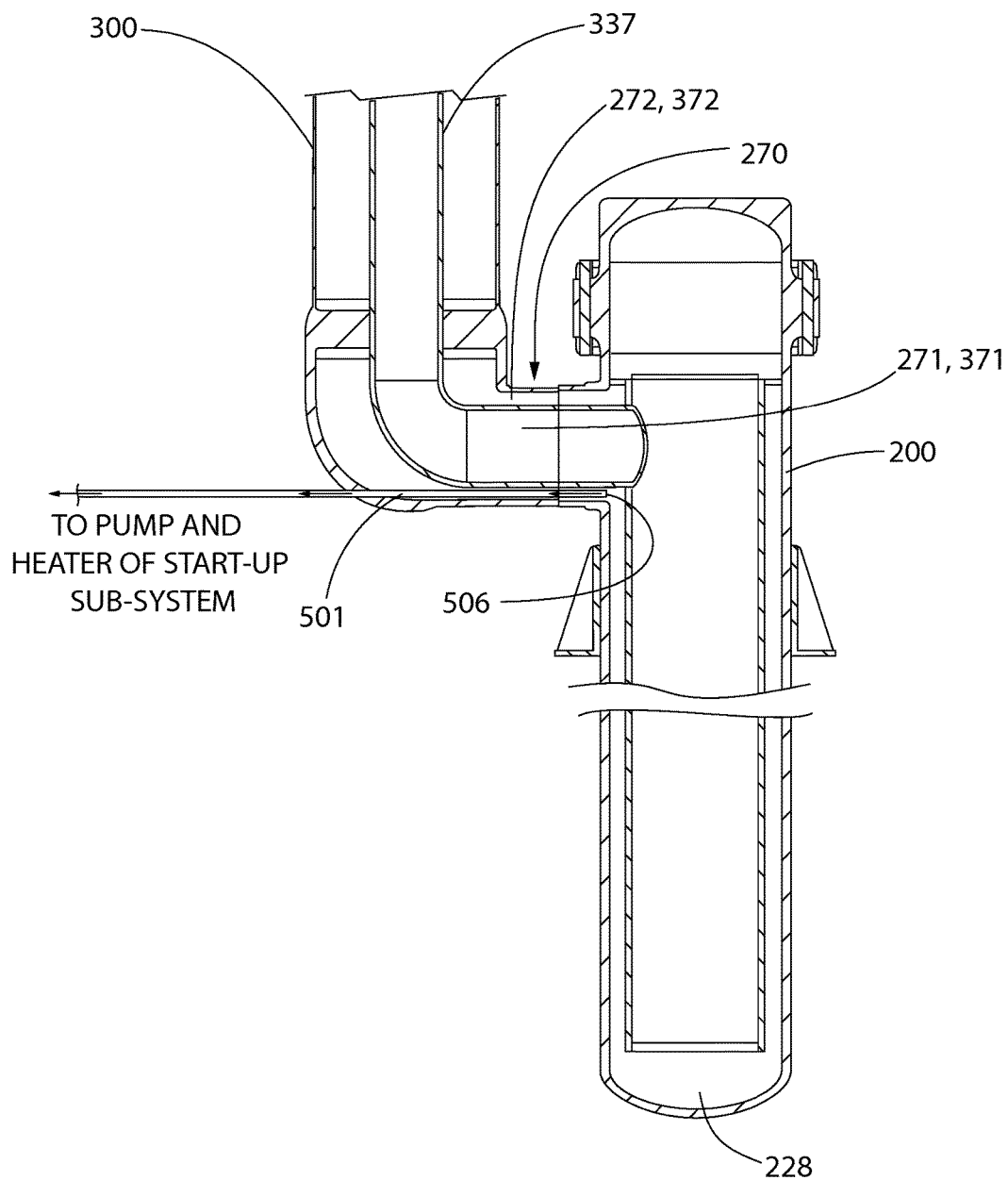
FIG. 5B is the close-up view of FIG. 5A illustrating the location of the intake conduit of the start-up sub-system in accordance with a second embodiment of the present invention.
Figure 5C:
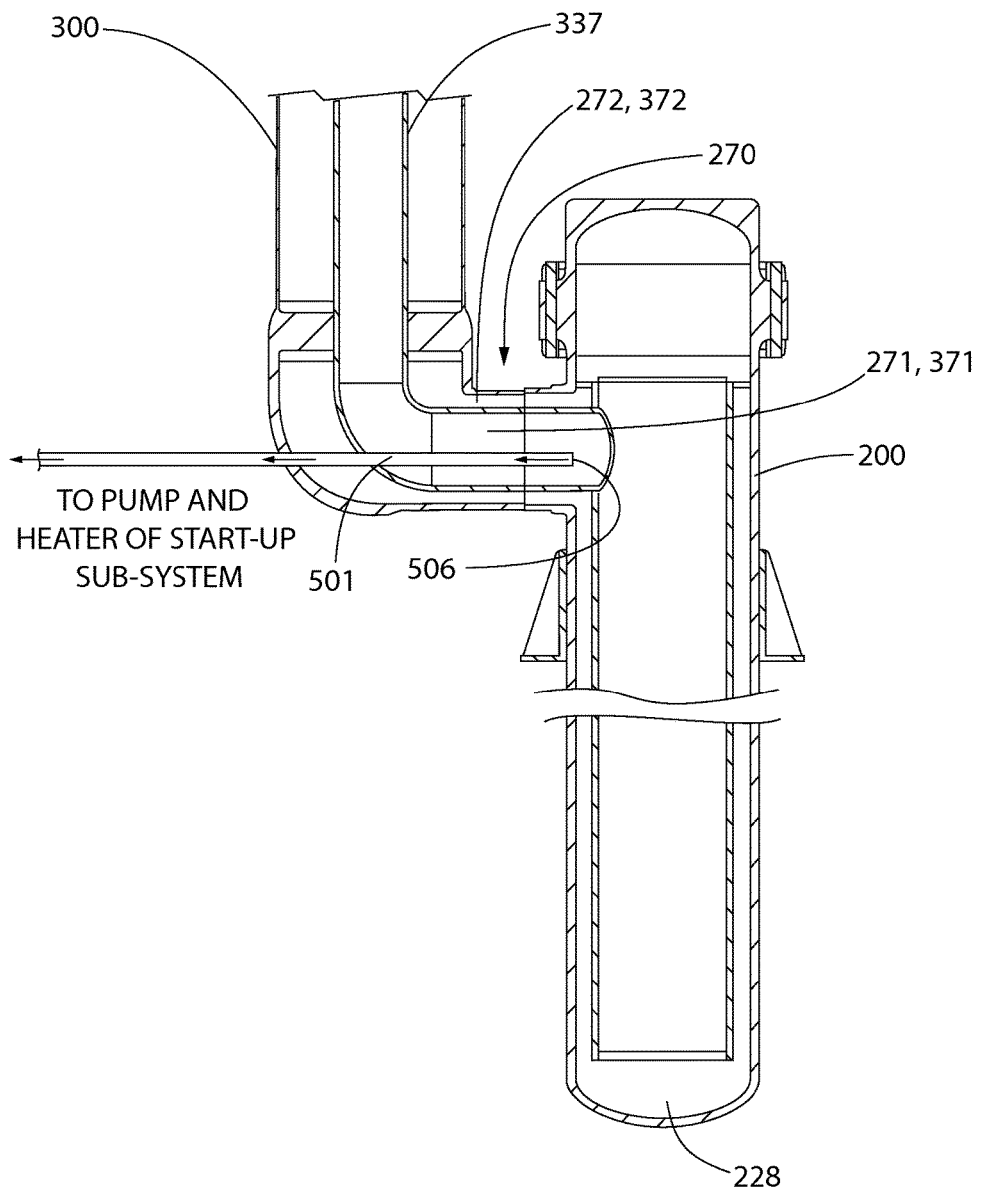
FIG. 5C is the close-up view of FIG. 5A illustrating the location of the intake conduit of the start-up sub-system in accordance with a third embodiment of the present invention.

Specifically. FIGS. 5A-5C show different places that the inlet 506 of the intake conduit 501 can be positioned in different embodiments. The positioning of the inlet 506 of the intake conduit 501 illustrated in FIGS. 5A-5C are merely exemplary and are not intended to be limiting of the present invention. Therefore, it should be understood that the inlet 506 of the intake conduit 501 can be located at any other desired location along the primary coolant loop. In FIG. 5A, the inlet 506 of the intake conduit 501 is positioned at the bottom of the reactor vessel 200. In FIG. 5B, the inlet 506 of the intake conduit 501 is positioned at the bottom of the steam generating vessel 300 or within the outer flow path 272, 372 of the fluid coupling 270 between the steam generating vessel 300 and the reactor vessel 200. In FIG. 5C, the inlet 506 of the intake conduit 501 is positioned within the riser pipe 337 or within the inner flow path 271, 371 of the fluid coupling 270 between the steam generating vessel 300 and the reactor vessel 200. The inlet 506 of the intake conduit 501 can also be positioned within the riser pipe 337 upstream of the fluid coupling 270 or at any other desired location within the primary coolant loop 190. Regardless of its exact positioning, the location of the inlet 506 of the intake conduit 501 is the location from which the portion of the primary coolant is withdrawn for introduction into the start-up sub-system 500.

In certain embodiments, the pump 502 may be fluidly coupled to more than one intake conduit or more than one inlet so that the primary coolant can be drawn from the primary coolant loop 190 and introduced into the start-up sub-system 500 from more than one location simultaneously, or so that an operator can determine the location from which the primary coolant can be taken based on desired applications and start-up time requirements. Specifically, there may be multiple intake conduits that are connected to the injection conduit such that there are valves associated within each intake conduit. One of the intake conduits can have an inlet located at a bottom of the reactor vessel 200 and another one of the intake conduits can have an inlet located at a bottom of the steam generating vessel 300. Thus, an operator can open one or more of the valves while leaving the other valves closed to determine the location(s) within the primary coolant loop 190 from which the primary coolant will be drawn for introduction into the start-up sub-system 500.

Referring back to FIG. 1, regardless of the exact positioning of the inlet 506 of the intake conduit 501, a portion of the primary coolant is drawn from the primary coolant loop 190 into the intake conduit 501 of the start-up sub-system 500 when it is desired to start the nuclear steam supply system 100. More specifically, in the exemplified embodiment the primary coolant is drawn from the primary coolant loop 190 by the operation of the pump 502. Specifically, in the exemplified embodiment when the pump 502 is turned on, the portion of the primary coolant is drawn from the primary coolant loop 190 and into the start-up sub-system 500. When the pump is turned off, none of the primary coolant is drawn from the primary coolant loop 190 and into the start-up sub-system 500.

Although the use of the pump 502 for drawing the portion of the primary coolant into the start-up sub-system 500 is described above, the invention is not to be so limited. In certain other embodiments, the start-up sub-system 500 may include a valve positioned at some point along the intake conduit 501. In some embodiments, the start-up sub-system 500 may also or alternatively include another valve positioned at some point along the injection conduit 503. The use of valves enables the start-up sub-system to be cut off from the reactor vessel 200 and the steam generating vessel 300 from a fluid flow standpoint. Specifically, by closing the valves the primary coolant will be unable to enter into the start-up sub-system 500, and the primary coolant loop will form a closed-loop path. One embodiment of the use of valves in the start-up sub system 500 and the connection/placement of those valves will be described in more detail below with reference to FIG. 7.

Where valves are used, the valves can be alterable between an open state whereby a portion of the primary coolant flows from the primary coolant loop and into the start-up sub-system 500 and a closed state whereby the primary coolant is prevented from flowing into the start-up sub-system 500. In some embodiments, both the pump 502 and one or more valves may be used in conjunction with one another to facilitate the flow of the portion of the primary coolant into the start-up sub-system 500.

Still referring to FIG. 1, when the pump 502 is operating (and any valves positioned between the reactor vessel 200 and the start-up sub-system 500 and between the steam generating vessel 300 and the start-up sub-system 500 are open), the portion of the primary coolant flows from the primary coolant loop 190 and into the intake conduit 501 through the inlet 506. In FIG. 1, this portion of the primary coolant is taken from the bottom of the reactor vessel 200 where the primary coolant is at its coldest. However, as discussed above the primary coolant can be taken from any location along the primary coolant loop 190, including from within the steam generating vessel 300 and within the riser pipe 337. The portion of the primary coolant flows through the intake conduit 501, passes through the pump 502 and flows into the injection conduit 503 whereby the portion of the primary coolant passes through the heating element 504. As the portion of the primary coolant passes through or by the heating element 504, the portion of the primary coolant is heated and becomes a heated portion of the primary coolant. The heated portion of the primary coolant then continues to flow along the injection conduit 503 and into the injection nozzle 505 where the heated portion of the primary coolant is injected back into the primary coolant loop 190.

Figure 6:
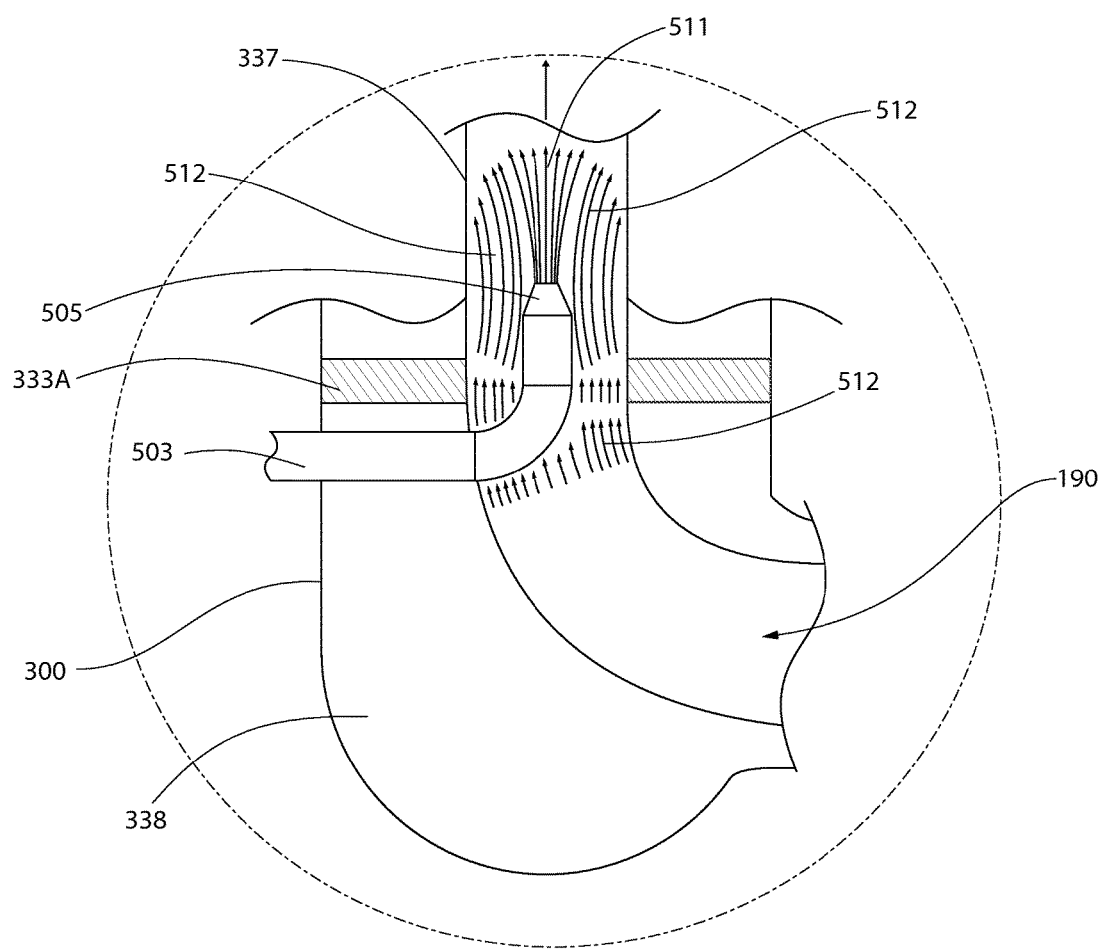
FIG. 6 is a close-up view of area VI of FIG. 1.

Referring to FIGS. 1 and 6 concurrently, the injection of the heated portion of the primary coolant into the primary coolant loop 190 will be discussed in more detail. In the exemplified embodiment, the injection nozzle 505 is positioned within the riser pipe 337 of the steam generating vessel 300. Of course, the invention is not to be so limited and the injection nozzle 505 can be positioned at other locations within either the reactor vessel 200 or the steam generating vessel 300 as desired. Specifically, the injection conduit 505 can be located within the riser column 224 of the reactor vessel 200, within the downcomer 222 of the reactor vessel 200, within the pressurizer 380 of the steam generating vessel 300 or at any other desired location.

In the exemplified embodiment the injection nozzle 505 is centrally located within the riser pipe 337 so as to be circumferentially equidistant from the inner surface of the riser pipe 337. Furthermore, the injection nozzle 505 faces in an upwards direction so that the heated portion of the primary coolant injected from the injection nozzle 505 is made to flow in a vertical upward direction. In the exemplified embodiment, the injection conduit 503 enters into the steam generating vessel 300 at the bottom-most tubesheet 333A elevation, and the injection nozzle 505 is positioned near or at the elevation of the bottom-most tubesheet 333A. More specifically, the injection conduit 503 extends horizontally into the riser 337 just below the bottom-most tubesheet 333A, an elbow connects the injection conduit 503 to the injection nozzle 505, and the injection nozzle 505 extends vertically from the elbow within the riser pipe 337. Specifically, the injection nozzle 505 in one embodiment is located so as to inject the heated portion of the primary coolant just above the bottom-most tubesheet 333A. Thus, in the exemplified embodiment the injection nozzle 505 is located at and injects the heated portion of the primary coolant to a location above the bottom plenum 338 of the steam generating vessel 300. Of course, the invention is not to be so limited in all embodiments and as discussed above the location at which the heated portion of the primary coolant is injected can be modified as desired.

In the exemplified embodiment, the injection nozzle 505 of the start-up sub-system 500 injects a heated portion of the primary coolant (indicated with arrows as 511) into the riser pipe 337 in a first vertical direction. At the time of the initial injection of the heated portion of the primary coolant 511 into the riser pipe 337, the primary coolant (indicated with arrows as 512) is positioned in the primary coolant loop 190 including within the riser pipe 337 but is static or non-moving. After the start-up sub-system 500 begins injecting the heated portion of the primary coolant 511 into the riser pipe 337 in the first vertical direction, the entire body of the primary coolant 512 within the primary coolant loop 190 begins to flow in the first vertical direction due to the venturi effect, as discussed below. In certain embodiments, once the primary coolant 512 within the primary coolant loop 190 begins to flow, it flows at a first flow rate. Furthermore, the heated portion of the primary coolant 511 is injected at a second flow rate, the second flow rate being greater than the first flow rate.

In the exemplified embodiment, the injection of the heated portion of the primary coolant 511 creates a venturi effect in the closed loop path 190, and more specifically in the riser pipe 337. Specifically, introducing a jet of high velocity heated primary coolant 511 into the riser pipe 337 creates a venturi effect in the riser pipe 337 that creates a low pressure in the vicinity of the injection nozzle 505. This low pressure pulls the primary coolant 512 from the bottom of the riser pipe 337 upwardly in the direction of the flow of the heated portion of the primary coolant 511 to the top of the steam generating vessel 300 and facilitates the flow of the primary coolant through the primary coolant loop 190. Thus, the injection of the heated portion of the primary coolant 511 from the start-up sub-system 500 initiates start-up of the nuclear steam supply system 100 by facilitating the flow of the primary coolant 512 through the primary coolant loop 190. Specifically, due to the venturi effect the mixture of the heated portion of the primary coolant 511 and the primary coolant 512 flows upwardly within the riser pipe 337, and due to gravity the mixed primary coolant 511/512 flows downwardly through the tubes 332 in the steam generating vessel 300 and downwardly through the downcomer 222 in the reactor vessel 200 due to thermosiphon flow. When the heated portion of the primary coolant 511 mixes with the primary coolant 512 in the riser pipe 337, this heated mixture expands and becomes less dense and more buoyant than the cooler primary coolant below it in the primary coolant loop. Convection moves this heated liquid upwards in the primary coolant loop as it is simultaneously replaced by cooler liquid returning by gravity.

Once the primary coolant gets heated up to the no-load operating temperature, the flow of the primary coolant in the primary coolant loop 190 is continuous without the use of an external pump. The start-up sub-system 500 and the pump 502 associated therewith merely operate to heat up the temperature of the primary coolant and to begin the flow of the primary coolant in the primary coolant loop 190 and to heat up the primary coolant in the primary coolant loop 190. However, the start-up sub-system 500 can be disconnected from the primary coolant loop 190 once no-load operating temperature of the primary coolant is reached and thermosiphon flow of the primary coolant in the primary coolant loop is achieved.

As discussed above, as the primary coolant in the primary coolant loop 190 heats up, the primary coolant expands. Thus, in certain embodiments the system 100 may be fluidly coupled to a chemical and volume control system which can remove the additional volume of the primary coolant as needed. Furthermore, such a chemical and volume control system can also remove dissolved gases in the primary coolant. Thus, the chemical and volume control system can be used to control the liquid level by draining and adding additional primary coolant into the primary coolant loop 190 as needed. In certain embodiments, the chemical and volume control system may be capable of adding and/or removing the primary coolant at a desired rate, such as at a rate of sixty gallons per minute in some embodiments. When used, the chemical and volume control system can be fluidly coupled to the nuclear steam supply system 100 at any desired location along the primary coolant loop 190.

During start-up of the nuclear steam supply system 100, the start-up sub-system 500 continues to take a portion of the primary coolant from the primary coolant loop 190, heat the portion of the primary coolant to form a heated portion of the primary coolant, and inject the heated portion of the primary coolant into the primary coolant loop 190. The flow of the heated portion of the primary coolant into the primary coolant loop 190 serves to heat up the primary coolant (which is actually a mixture of original primary coolant and the heated portion of the primary coolant) during the start-up process. Once the primary coolant in the primary coolant loop 190 reaches the no load operating temperature, the pump 502 is turned off or the start-up sub-system 500 is otherwise isolated/disconnected/valved off from the primary coolant loop 190. In certain embodiments, only after the primary coolant reaches the no load operating temperature do the control rods begin to be withdrawn.

During the start-up procedures discussed above, the secondary coolant (i.e., feedwater) continues to be circulated on the shellside 305 of the steam generating vessel 300. Thus, as the primary coolant heats up due to the start-up procedures and begins to flow through the primary coolant loop 190 including through the tubes 332 of the steam generating vessel, the secondary coolant flowing through the shellside 305 of the steam generating vessel 300 boils to produce steam. This steam is held inside of the steam generating vessel 300 until a desired pressure is reached. Once the desired pressure is reached, a steam isolation valve (i.e., a valve between the steam generating vessel 300 and the turbine 900) is opened and a portion of the steam is sent to the turbine 900 for turbine heat-up and the remainder of the steam is sent to the condenser in a bypass operation.

In certain embodiments, the steam is sent to the turbine 900 for power production only when all of the control rods are fully withdrawn and the nuclear steam supply system 100 is at full power. Furthermore, as noted above the control rods are only fully withdrawn in some embodiments after the primary coolant reaches the no-load operating temperature. Thus, in those embodiments, during the start-up process no steam is sent to the turbine 900 for power production (although it may be sent to the turbine 900 for turbine heat-up). Power production begins in such embodiments only when the start-up process is complete and the primary coolant flows through the primary coolant loop 190 passively without the operation of a pump.

In addition to heating the primary coolant within the primary coolant loop 190, the start-up sub-system 500 can also be used for draining the primary coolant from the primary coolant loop 190 if the need arises. In certain embodiments, such as the embodiment depicted in FIGS. 1 and 5A whereby the inlet 506 of the intake conduit 501 is positioned at a bottom of the reactor vessel 300, this can include draining primary coolant from the reactor vessel 200. Furthermore, the start-up supply system 500 can be used to remove debris that may accumulate at the bottom of the reactor vessel 200 or at the bottom of the steam generating vessel 300, depending on the location of the inlet 506 of the intake conduit 501.

Figure 8:
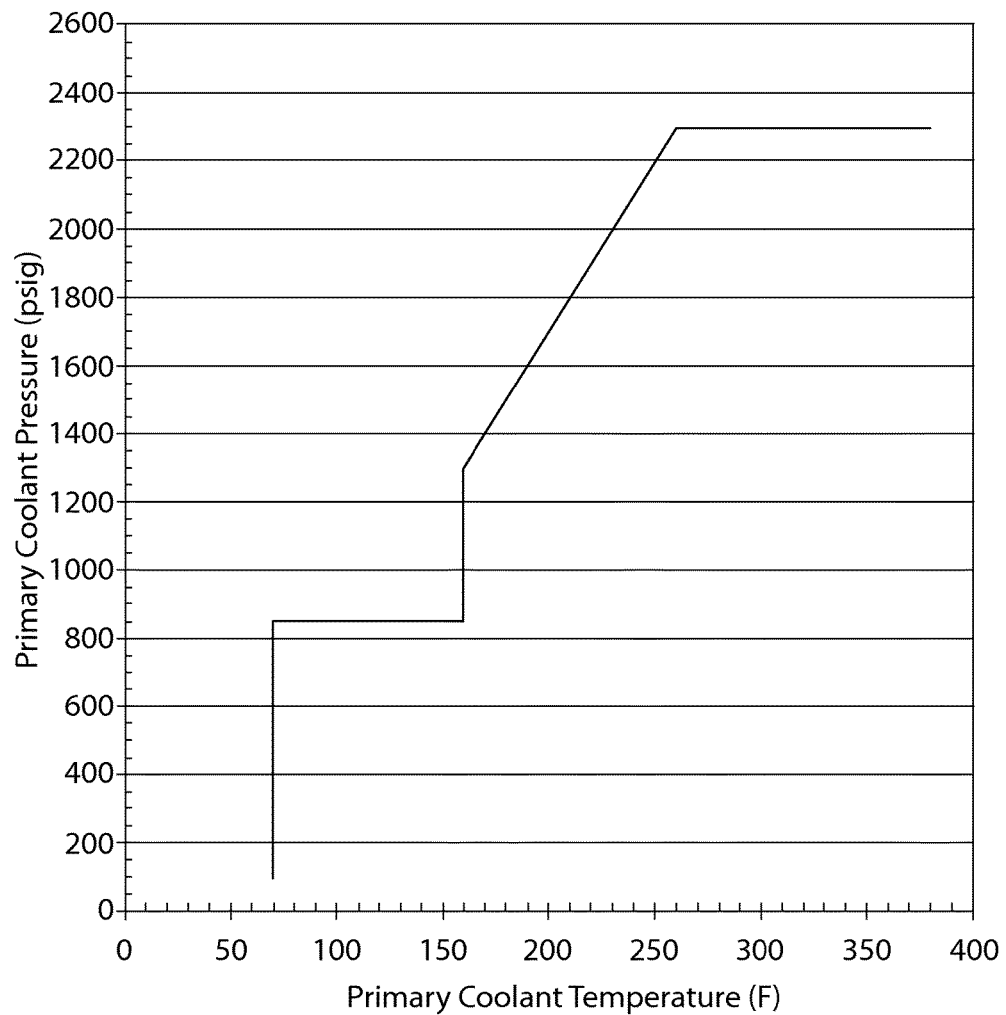
FIG. 8 is a graph illustrating the primary coolant pressure vs. the primary coolant temperature.

In certain embodiments, as the primary coolant is being heated by injecting the heated portion of the primary coolant into the primary coolant loop 190 using the start-up sub-system 500, pressure in the primary coolant loop 190 is increased in stages by introducing high pressure inert gas into the pressurizer 380 volume. The two-phase (inert gas—water vapor with liquid water) equilibrium maintains the liquid level in the pressurizer 380 volume. The staged increase in pressure follows the typical heat-up curve as shown in FIG. 8, which is based on a brittle toughness curve specific to the primary coolant loop 190, reactor vessel 200 and steam generating vessel 300 material of construction.

Figure 7:
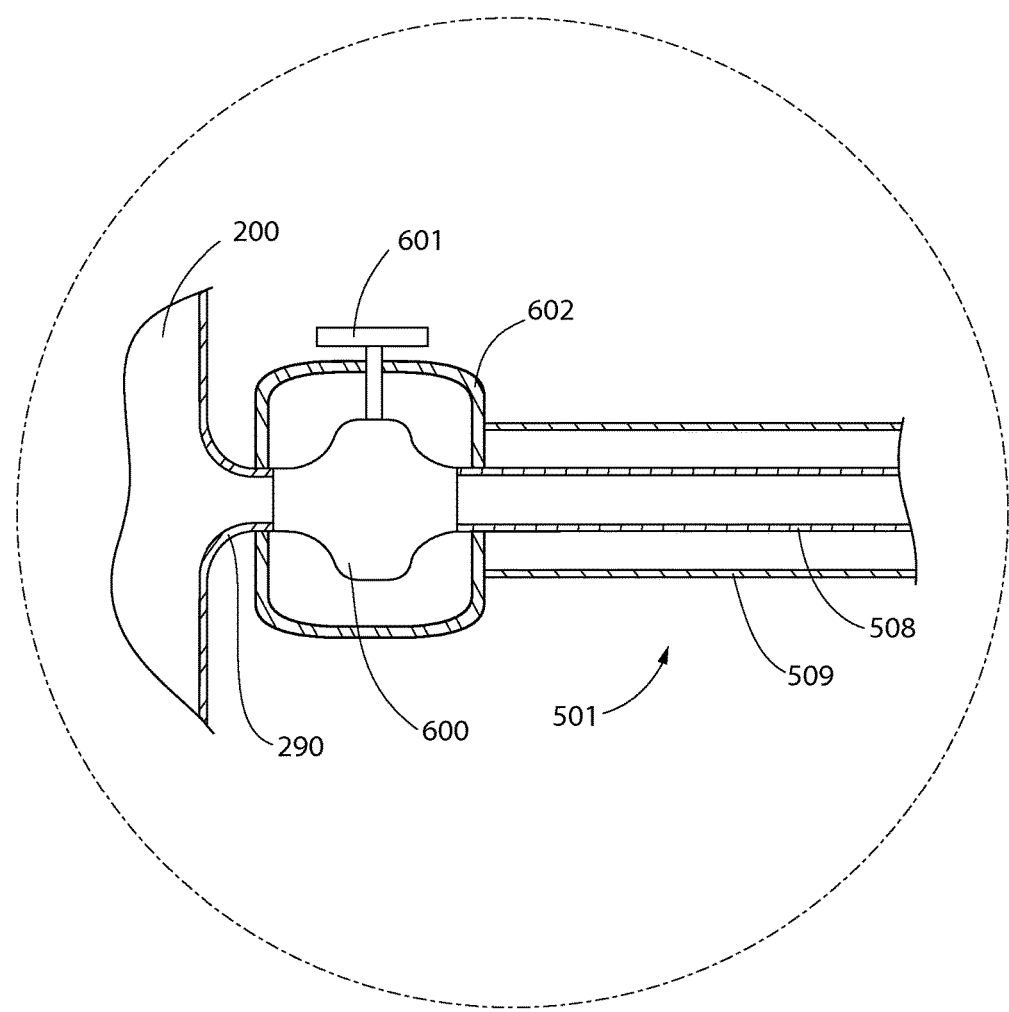
FIG. 7 is a schematic illustrating the connection between the start-up sub-system and the reactor vessel.

Referring now to FIG. 7, the interconnection between the start-up sub-system 500 and the reactor vessel 200 will be described. Although FIG. 7 only depicts the connection between the start-up sub-system 500 and the reactor vessel 200, it should be appreciated that an identical connection can be used for connecting the start-up sub-system 500 to the steam generating vessel 300. Stated another way, FIG. 7 illustrates the manner in which the intake conduit 501 is connected to the reactor vessel 200 in a manner that prevents or eliminates or substantially reduces the likelihood of a loss-of-coolant accident. Of course, certain embodiments may omit the valves discussed below, and in certain embodiments the connection between the start-up sub-system 500 and the reactor vessel 200 and the steam generating vessel 300 may be achieved in other manners than that discussed directly below.

As illustrated in FIG. 7, the intake conduit 501 comprises a concentric pipe construction including an inner pipe 508 that carries the portion of the primary fluid from the primary coolant loop 190 and an outer pipe 509 that concentrically surrounds the inner pipe 508. The outer pipe serves as a redundant pressure boundary to contain the portion of the primary coolant within the piping in case the inner pipe 508 were to develop a leak. Two independent pressure enclosures (i.e., the inner pipe 508 and the outer pipe 509) serve to render the potential of a pipe break loss-of-coolant accident non-credible.

The inner pipe 508 is directly connected to a valve 600. Furthermore, the valve 600 is enclosed in a pressure vessel 602 which encloses the entirety of the valve 600 except for the valve stem 601. Thus, the valve stem 601 extends from the pressure vessel 602 so that manual opening and closing of the valve 600 is still possible while the pressure vessel 602 remains enclosing the valve 600. The inner pipe 509 connects to the valve 600 within the pressure vessel 602. Thus, the pressure vessel 602 prevents any loss-of-coolant accident event initiating at the weldment between the valve 600 and the inner/outer pipe 508, 509 arrangement. Specifically, if there was a breakage at the weldment between the valve 600 and the inner pipe 508, any coolant leakage would occur within the pressure vessel 602 and would not escape into the environment or elsewhere where it could cause harm.

Furthermore, the reactor vessel 200 comprises a forging 290 in the form of a piping nozzle forged integrally with the reactor vessel as shown in FIG. 7 and extending from the sidewall thereof. The valve 600 is directly welded to the forging 290. This eliminates the possibility of pipe breakage between the reactor vessel 200 and the valve 600. Furthermore, the connection between the forging 290 and the valve 600 occurs within the pressure vessel 602 so that a break at the weldment between the forging 290 and the valve 600 would result in coolant leakage occurring within the pressure vessel 602.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A nuclear steam supply system comprising:
   a reactor vessel having an internal cavity, a reactor core comprising nuclear fuel disposed within the internal cavity;
   a steam generating vessel fluidly coupled to the reactor vessel;
   a riser pipe positioned within the steam generating vessel and fluidly coupled to the reactor vessel;
   a primary coolant loop formed within the reactor vessel and the steam generating vessel, a primary coolant in the primary coolant loop; and
   a start-up sub-system comprising:
      an intake conduit having an inlet located in the primary coolant loop;
      a pump fluidly coupled to the intake conduit for pumping a portion of the primary coolant from the primary coolant loop through the intake conduit and into an injection conduit connected externally to a discharge side of the pump;
      at least one heating element fluidly coupled to the injection conduit for heating the portion of the primary coolant to form a heated portion of the primary coolant; and
      an injection nozzle fluidly coupled to the injection conduit and having an outlet positioned within the riser pipe for injecting the heated portion of the primary coolant directly into the riser pipe.

2. The nuclear steam supply system according to claim 1 wherein the inlet of the intake conduit is located at a bottom of the reactor vessel.

3. The nuclear steam supply system according to claim 1 wherein the inlet of the intake conduit is located at a bottom of the steam generating vessel.

4. The nuclear steam supply system according to claim 1 wherein the inlet of the intake conduit is located at a bottom of the riser pipe.

5. The nuclear steam supply system according to claim 1 wherein the steam generating vessel comprises a steam generating section and a superheater section disposed above the steam generating section, the superheater section being operable to heat a secondary coolant to superheated steam conditions.

6. The nuclear steam supply system according to claim 5 further comprising:
   each of the steam generating section and the superheater section including a pair of vertically spaced apart tubesheets and a tube bundle comprising a plurality of vertically-oriented tubes extending between the tubesheets; and
   wherein the injection nozzle is positioned so as to inject the heated portion of the primary coolant into the riser pipe of the steam generating section at or near an elevation of a bottom one of the tubesheets.

7. The nuclear steam supply system according to claim 1 wherein the injection conduit is a pipe having a diameter of approximately six inches and wherein the injection nozzle has a diameter of approximately three inches.

8. The nuclear steam supply system according to claim 1 wherein the injection nozzle injects the heated portion of the primary coolant into the riser pipe in a same direction as the primary coolant flow path through the riser pipe which creates a venturi effect that causes the primary coolant to flow along the primary coolant loop.

9. The nuclear steam supply system according to claim 1 further comprising:
   the steam generating vessel including a plurality of stacked heat exchangers fluidly connected in a vertically stacked relationship;
   the stacked heat exchangers each including a pair of vertically spaced apart tubesheets and a tube bundle comprising a plurality of vertically oriented tubes extending between the tubesheets;
   wherein upon injecting the heated portion of the primary coolant into the riser pipe, the primary coolant flows vertically upwards through the riser pipe to a top of the steam generating vessel, vertically downwards from the top of the steam generating vessel through the tubes of the stacked heat exchangers, vertically downwards through a downcomer in the reactor vessel to the bottom of the reactor vessel, vertically upwards within a riser column in the reactor vessel, and from the riser column in the reactor vessel back to the riser pipe in the steam generating vessel; and
   wherein a secondary coolant flows upwards between the tubes on a shell side of each of the stacked heat exchangers.

10. The nuclear steam supply system according to claim 1 wherein the reactor vessel, the steam generating vessel and the start-up sub-system are positioned within a containment vessel.

11. The nuclear steam supply system according to claim 1 wherein at least a portion of the start-up sub-system is positioned external to the reactor vessel and the steam generating vessel.

12. The nuclear steam supply system according to claim 1 wherein the start-up sub-system is a one-way fluid flow circuit that flows the portion of the primary coolant from the primary coolant loop, through the pump, into the injection conduit, through the at least one heater, and into the riser pipe of the steam generating vessel via the injection nozzle.

13. The nuclear steam supply system according to claim 12 wherein the pump and the at least one heater are positioned external to the reactor vessel and the steam generating vessel.

14. The nuclear steam supply system according to claim 1 wherein the start-up sub-system further comprises a valve that is welded at one end to a forging in the form of an integral piping nozzle of the reactor vessel and at another end to an inner pipe fluidly coupled to the valve and arranged inside an outer pipe that concentrically surrounds the inner pipe, the inner and outer pipes collectively forming the intake conduit.

15. The nuclear steam supply system according claim 14 further comprising a pressure vessel enclosing the valve, a valve stem of the valve protruding from the pressure vessel, and wherein a connection between the inner pipe and the valve and a connection between the valve and the integral piping nozzle of the reactor vessel are located within the pressure vessel.

16. The nuclear steam supply system according to claim 1 wherein the heated portion of the primary coolant mixes with the primary coolant in the riser pipe to form a mixed primary coolant.

17. The nuclear steam supply system according to claim 16 further comprising:
a plurality of control rods positioned within the internal cavity of the reactor vessel.

18. The nuclear steam supply system according to claim 1 wherein the primary coolant flows through the riser pipe in the steam generating vessel at a first flow rate and wherein the heated portion of the primary coolant is injected into the riser pipe at a second flow rate produced by the pump which is greater than the first flow rate.

19. The nuclear steam supply system according to claim 1 wherein the primary coolant flows through the riser pipe in the steam generating vessel in a vertical direction and wherein the heated portion of the primary coolant is injected into the riser pipe in the vertical direction.

20. The nuclear steam supply system according to claim 1, wherein the injection nozzle has a portion which extends inside the riser pipe which is vertically oriented.

21. The nuclear steam supply system according to claim 20, wherein the portion of injection nozzle which extends inside the riser pipe includes an elbow arranged to discharge the heated portion of the primary coolant in a vertically upwards direction into the riser pipe.

22. A nuclear steam supply system comprising:
a reactor vessel having an internal cavity, a reactor core comprising nuclear fuel disposed within the internal cavity;
a steam generating vessel fluidly coupled to the reactor vessel and including a riser pipe positioned within the steam generating vessel and fluidly coupled to the reactor vessel;
a primary coolant loop formed within the reactor vessel and the steam generating vessel, a primary coolant in the primary coolant loop; and
a start-up sub-system comprising:
an intake conduit having an inlet located in the primary coolant loop;
a pump fluidly coupled to the intake conduit for pumping a portion of the primary coolant from the primary coolant loop through the intake conduit and into an injection conduit connected externally to a discharge side of the pump;
at least one heating element fluidly coupled to the injection conduit for heating the portion of the primary coolant to form a heated portion of the primary coolant; and
a Venturi injection nozzle fluidly coupled to the injection conduit and having an outlet positioned within the riser pipe for injecting the heated portion of the primary coolant directly into the riser pipe.

23. The nuclear steam supply system according to claim 22 wherein the start-up sub-system receives the portion of the primary coolant from an inlet of the intake conduit located in a bottom of the reactor vessel.

24. The nuclear steam supply system according to claim 22 wherein the start-up sub-system receives the portion of the primary coolant from an inlet of the intake conduit located in a bottom of the reactor vessel.

25. The nuclear steam supply system according to claim 24 wherein the start-up sub-system receives the portion of the primary coolant from an inlet of the intake conduit located in a bottom of the riser pipe.

26. The nuclear steam supply system according to claim 22 wherein the injection nozzle of the start-up sub-system is configured to inject the heated portion of the primary coolant in an upwards direction into the riser pipe.

* * * * *